C. M. WRIGHT.
CHEESE CUTTER.
APPLICATION FILED AUG. 13, 1906.
910,442.
Patented Jan. 19, 1909.
3 SHEETS—SHEET 1.
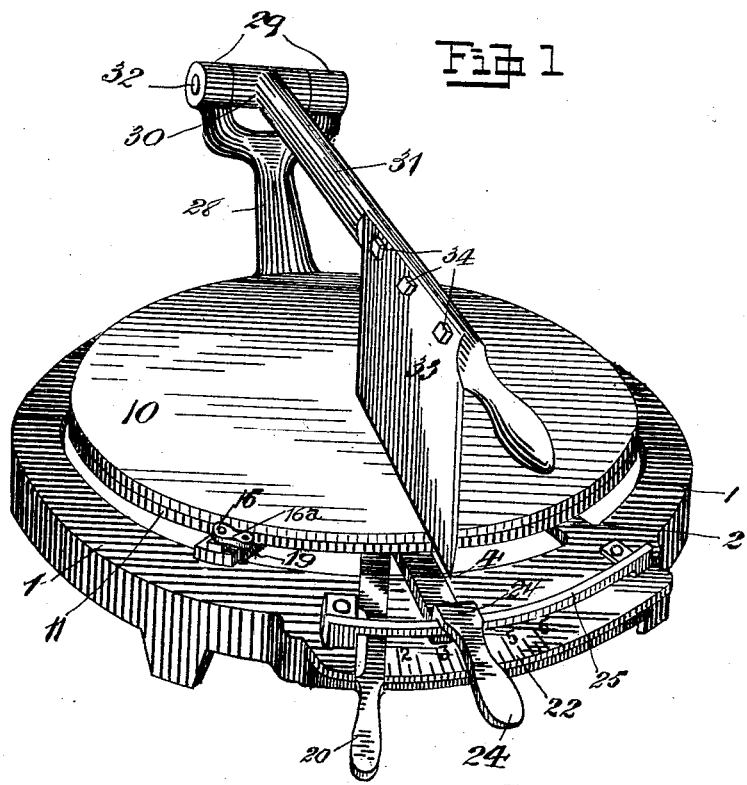
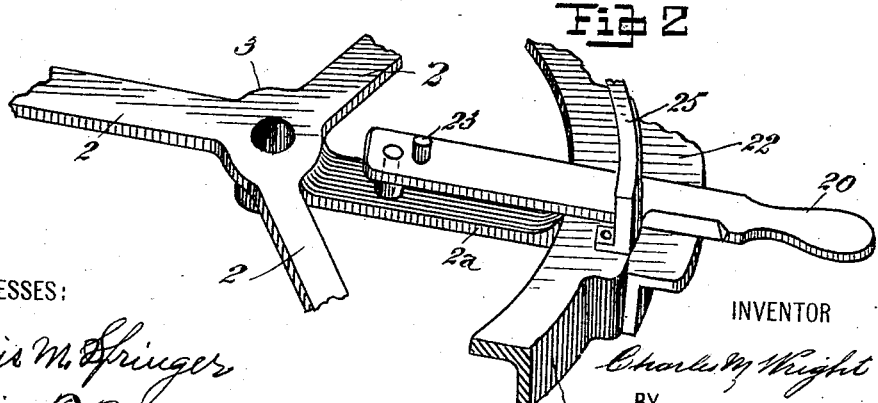
WITNESSES:
INVENTOR
BY
ATTORNEY C. M. WRIGHT.
CHEESE CUTTER.
APPLICATION FILED AUG. 13, 1906.
910,442.
Patented Jan. 19, 1909.
3 SHEETS—SHEET 2.
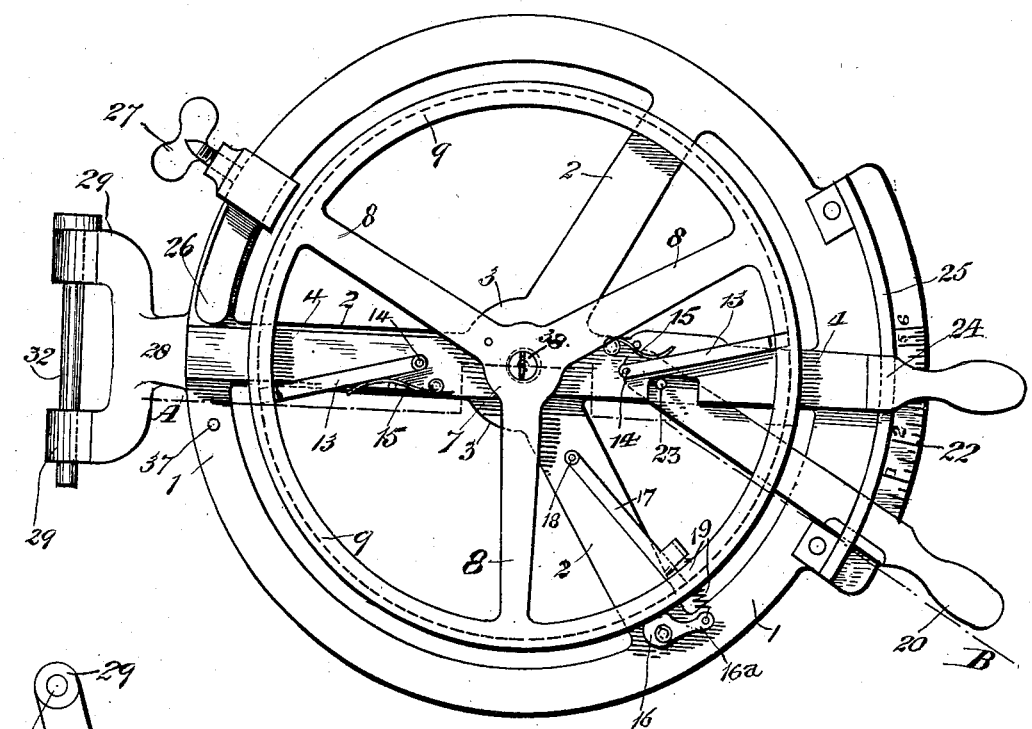
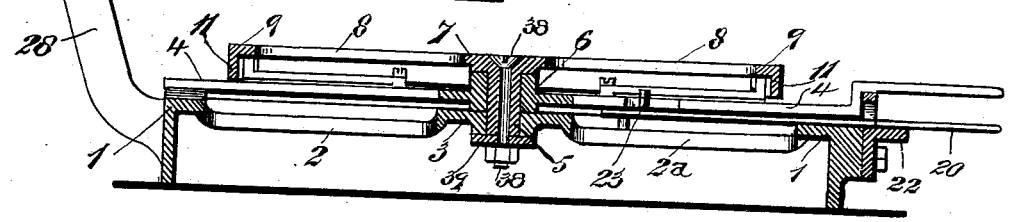
WITNESSES:
Francis M. Springer
Calvin F Brandow
INVENTOR
Charles M. Wright
BY
Thompson K Bell
ATTORNEY

C. M. WRIGHT.
CHEESE CUTTER.
APPLICATION FILED AUG. 13, 1906.

910,442.

Patented Jan. 19, 1909.

3 SHEETS—SHEET 3.

WITNESSES:
Francis M. Springer
Calvin F. Brandon

INVENTOR
Charles M. Wright
BY
Thompson & Bell
ATTORNEY

UNITED STATES PATENT OFFICE.

CHARLES M. WRIGHT, OF ANDERSON, INDIANA, ASSIGNOR, BY DIRECT AND MESNE ASSIGNMENTS, TO ALFRED L. REED, OF ANDERSON, INDIANA.

CHEESE-CUTTER.

No. 910,442.　　　　　Specification of Letters Patent.　　　Patented Jan. 19, 1909.

Application filed August 13, 1906. Serial No. 330,446.

*To all whom it may concern:*

Be it known that I, CHARLES M. WRIGHT, a citizen of the United States, residing at Anderson, in the county of Madison and State of Indiana, have invented certain new and useful Improvements in Cheese-Cutters, of which the following is a specification, reference being had therein to the accompanying drawing.

This invention relates to a machine for cutting cheese into portions of varying values or weights and consists in a cheese dividing apparatus hereinafter described in the specification and particularly pointed out in the claims.

The object of this invention is to provide an apparatus for dividing or cutting cheese into slices or portions of predetermined value or weight.

The feature of this invention consists in a direct scale of value prices or weights whereby the mechanism of the machine is set in accordance with the said scale of values or weights. The throw or travel of the actuating lever that actuates the cheese carrying table is adjusted or set in accordance with said scale to move through uniform distances representing a fixed value for each cheese.

I attain this object by means of the mechanism illustrated in the accompanying drawings in which similar numerals of reference designate like parts throughout the several views.

Figure 5:
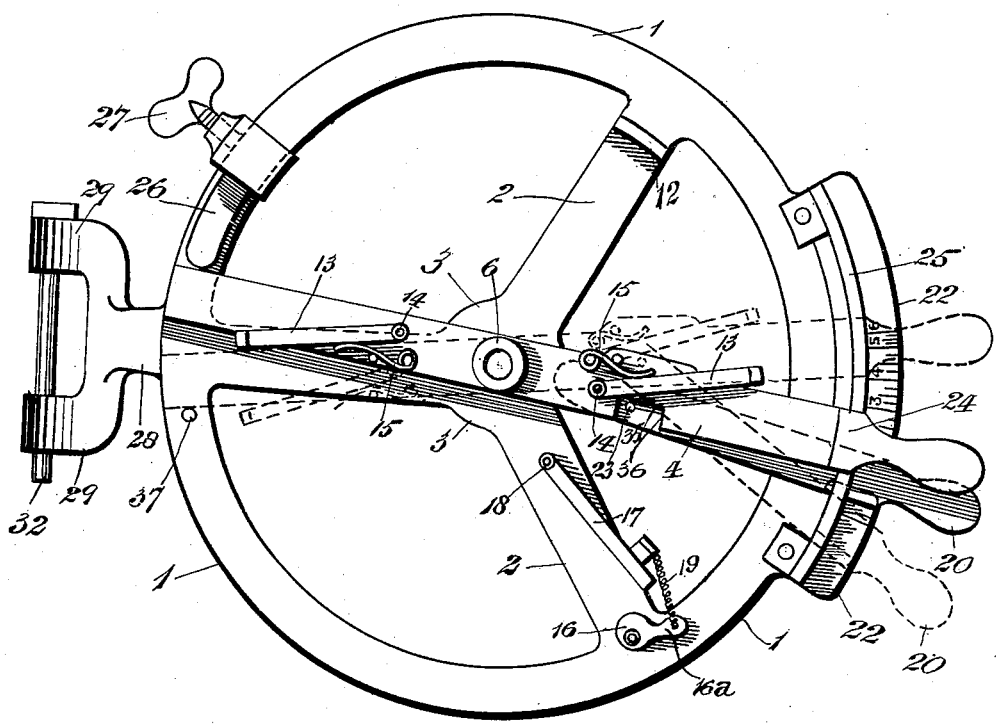
Figure 6:
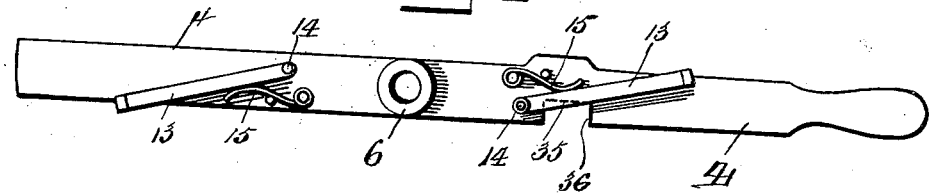

Figure 1 is a perspective view of my invention of a cheese cutter; Fig. 2 is a detail broken perspective view of the base of the apparatus and showing the setting lever of the apparatus; Fig. 3 is a plan view of the apparatus showing the cheese carrying table and the cheese cutting knife removed in order to exhibit the actuating mechanism of said cheese carrying table; Fig. 4 is a sectional view of the same taken through the line A. B. see Fig. 3; Fig. 5 is a plan view of the apparatus showing the cheese carrying table and its frame removed to exhibit the mechanism of the actuating lever and the manner of setting the same to cut a cheese into portions of a predetermined weight or value; and Fig. 6 is an enlarged detail view of the actuating lever showing the clutch mechanism thereof.

The supporting frame or base 1 of this apparatus is preferably of a circular form and is provided with the radially extending arms 2 which support the boss 3 situated centrally of the base 1. The boss 3 is provided with a vertical bore adapted to receive the depending pin 5 of the cheese table supporting frame.

The actuating or clutch-carrying lever 4 is provided at its central portion with a boss 6 which is situated intermediate the ends of the lever 4 and projects above and below the top and bottom sides of said lever. The actuating or clutch carrying lever 4 is therefore pivotally mounted at its center portion on the center or depending pin 5, the axis of which is the axis of the table carrying frame which center or axis is fixed. The boss 6 is also provided with a bore adapted to also receive the center depending pin 5 of the cheese table supporting frame.

The cheese table carrying frame is composed of the central boss 7 from the under side of which depends the center pin 5, the integral arms 8 which extend radially from the boss 7 to the rim 9 and the rim 9 and the top sides of these are flush or level to form a support for the cheese supporting table 10 which is preferably of wood. The depending rim or flange 11 of the rim 9 is truly turned on its inner and outer sides to reduce it to an even thickness and thereby be more readily engaged by the engaging clutches of the actuating lever 4 hereinafter described. The bottom edge of the rim or flange 11 is also turned truly to bear or rest upon its supporting or bearing block 12 formed integral on the base or frame 1, which operates as a steadying means and prevents the table carrying frame from tilting or unduly vibrating.

The actuating or clutch carrying lever 4 is situated between the top of the base 1 and the boss 7 of the table carrying frame, and the depending center or pivotal pin 5, being centered in the bore of the center boss 3 of the base 1, operates not only as a trunnion or bearing arbor for said actuating lever, around which it is adapted to swing or oscillate, but also as a fixed center pin for the table carrying frame. Friction engaging clutch arms 13 are pivoted on the top side of the actuating lever 4 by their pivotal centers 14 in such position thereon that the engaging ends of said clutch arms will engage the inner surface or side of the friction rim or flange 11 on the diametrically opposite sides thereof so that the pressure exerted by the clutch-arm situated on one end of the actuating or clutch-carrying lever may be counteracted by the pressure exerted by the clutch-arm situated on the other end of said actuating or clutch-carrying lever and to cause the latter to rotate or move in one direction with each oscillation of the actuating lever 4. Clutch retaining springs 15 are secured on said actuating lever 4 in position thereon to firmly press against said clutch arms 13 to maintain the engaging ends of said arms in engagement with the rim or flange 11. A clutch rim retaining cam 16 is pivotally mounted on the top of the base 1 exterior of and adjacent to the flange or rim 11 and in position relative thereto to engage or contact with said rim or flange 11. Opposing this cam clutch 16 is situated on the base 1 within the rim or flange 11 the clutch arm 17 which is pivotally connected to said base 1 by its pivotal pin 18 which is so situated that the engaging end of said arm 17 will readily engage the inner edge or side of the rim 11. A connecting coil spring 19 connects the arm 16ᵃ of the cam engaging clutch 16 to the depending arm 19ᵃ of the clutch arm 17 so that both clutches are simultaneously brought into and maintained in engagement with the rim or flange 11.

The setting lever 20 whereby the throw or travel of the actuating lever 4 is determined for a cheese of known value or weight to move the cheese table 10 certain predetermined distances corresponding with certain required cheese values or weights, is pivotally mounted at one end to one of the arms 2ᵃ of the base 1 and extends from its pivotal end outwardly to, over and beyond the base 1 to sweep over the face of the value scale 22, situated at the front portion of the base 1 and having a curvature corresponding to the curvature of the front portion of the base 1 so as to be fitted close thereto with its graduated face set to be flush with the top surface of said base ring to be in close proximity to the swinging end of the setting lever 20 or it may be in contact with the latter.

The value scale 22 is graduated or divided into divisions which are indicated by numbers which represent certain specific values ranging from one dollar to six dollars and these numbers ascend or increase from left to right to accord with the setting mechanism whereby the actuating lever is controlled.

A stop or setting pin 23 projects above the top side of the setting lever 20 in the plane of the actuating lever 4 and is provided for the purpose hereinafter set forth.

The actuating lever 4 is provided with a cranked or offset handle end portion 24, and is arranged to extend over and bear upon the supporting bar 25 which is secured to the top side of the base 1 and operates as a rest for the free end of said lever 4. An adjustable stop 26 is provided with a clamping or thumb screw 27 whereby it is secured to the base 1, and the said adjustable stop is provided to be set to limit the motion of throw of the actuating lever 4.

A standard 28, situated on that side of the base 1 opposite the scale 22, terminates in a hinge fork 29 between the bifurcations of which the hinge 30 of the knife lever 31 is pivoted by a pin 32. The cheese cutting knife 33 is removably secured to the lever 31 by the bolts 34. See Fig. 1.

The main feature of this invention consists in the mechanism for setting the actuating lever 4 to cut certain portions of cheese off a cheese of predetermined value or weight. To do this it is necessary to first weigh the whole cheese that is to be divided into portions. This weight or value having been determined, the cheese is placed upon the table 10 to be central therewith. The setting lever 20 is moved to the numeral on the scale 22 designating the weight or value of the cheese placed upon the table 10. The actuating lever 4 is moved till the inner edge 35 of the gap 36 contacts with the setting pin 23. The adjustable stop 26 is then moved till it contacts with the end of the actuating lever 4 and securely fastened or clamped in this new position by the thumb screw 27 and the setting lever 20 is returned to its unset position as shown in Figs. 1, 3 and 5. The actuating lever 4 is now limited to move the cheese certain fixed distances so that the knife will cut aliquot portions of the cheese, which distance is limited to the clear space between the fixed stop 37 and the adjustable stop 26.

The center depending pin 5 is provided with a central bore into which is fitted a retaining bolt 38 the countersunk head of which is fitted into the correspondingly formed countersink at the top end of said bolt receiving bore to be flush therewith and a washer 39 is secured to the bottom end of said pin 5 to prevent said pin being raised with the supporting frame of the table 1 thereby causing the rim 11 becoming disengaged from the friction clutch arms 13.

I claim:—

1. In a device for cutting cheese into portions of predetermined values, the combination with a knife, a cheese carrier, an actuating lever for moving said cheese carrier, of a setting lever, a stop on said setting lever and a scale of values whereto said setting lever is adjusted to regulate the stroke of the actuating lever.

2. In a device for cutting cheese into portions of predetermined values, the combination with a knife, a cheese carrier, means for moving said cheese carrier, of a setting lever, a value scale over which said setting lever extends to sweep over the face thereof and whereby the said setting lever is adjusted to regulate the movement of the cheese carrier mechanism.

3. In a cheese cutter, the combination with a supporting base, a rotary table carried by said base, a vibratory lever and a clutch carried by said lever for engaging said rotary table, of a setting lever pivotally mounted on said base whereby the throw of said vibratory lever is adjusted and a value scale situated to be within the sweep of the end portion of said setting lever.

4. In a cheese cutter, the combination with a supporting base, a cheese carrier pivotally mounted on said base, a vibratory lever and a cheese carrier engaging clutch carried by said vibratory lever, of a value scale, a setting lever pivoted at its end to sweep over the face of said scale, a setting stop on the top of said setting lever and in the plane of the sweep of said vibratory lever, whereby the throw of said vibratory lever is adjusted to correspond to the values of said scale.

In testimony whereof I affix my signature in presence of two witnesses.

CHARLES M. WRIGHT.

Witnesses:
J. K. ROBERTS,
GEO. M. OVERMAN.